Patented June 26, 1945

2,379,068

UNITED STATES PATENT OFFICE 2,379,068

METHODS OF MAKING DEHYDRATED CITRUS FRUITS

Harold K. Derby, Berkeley, Calif., assignor to F. E. Booth Company, Inc., San Francisco, Calif., a corporation of Nevada No Drawing. Application June 8, 1943,
Serial No. 490,047

5 Claims. (Cl. 99—206)

My invention relates to the dehydration of oranges and particularly navel oranges, as well as to the resulting products.

Dehydrated orange products have not been accepted by the public to the fullest extent because the flavor thereof is quite different from and not as pleasing as the ripe, raw orange, and the difference in flavor is very marked, for example, in the case of navel oranges. Products made heretofore by dehydrating navel oranges without the peel and using only the inside edible portions, when reconstituted by the addition of water with or without flavoring substances, result in a drink which may be palatable, particularly if flavoring materials are added, if drunk immediately but which often becomes bitter on standing for as short a period of time as one-half hour. Such bitterness does not always develop in the case of navel oranges even after the reconstituted beverage has stood for several days. Quick development of bitterness seems to be affected by the place where the oranges were grown, the season of the year, the ripeness, or perhaps some other condition. Whatever the cause, there is no way to determine beforehand whether a certain batch of navel oranges will yield a dehydrated product which will form a reconstituted beverage which will or will not turn bitter quickly. Similar products differing only by including the peel, when similarly reconstituted, impart a burning sensation to the lips and mouth in addition to acquiring the bitter taste as referred to above. These undesirable characteristics are shared to a greater or less degree by Valencia or seed-type oranges, grapefruit, lemons, and limes, and the less common citrus fruits as well. The peels of the different citrus fruits are unpalatable unless candied or made into marmalade.

Objects of the invention are to make the peels of citrus fruits palatable, to dehydrate navel and other oranges and other citrus fruits so that drinks made by reconstituting the dehydrated products will be more palatable and remain palatable longer than drinks made by reconstituting any prior products of a more or less similar nature, to avoid or at least delay the development of the above mentioned bitterness, to avoid or lessen the above mentioned burning sensation when the skins are used, to provide products having high nutritive values, and other objects will be apparent on reading this specification.

A description of the preferred procedure as applied to navel oranges which results in the improved products follows.

Clean, sound, raw, ripe, whole navel oranges (including the peel but without the stem) are subjected to the action of a slicing machine. The term "peel" is used herein to designate what is ordinarily removed when an orange is eaten, namely that part extending from the outside down to the juicy inside. The outer colored part of the peel is called "flavedo" and the inner white part "albedo." All of the peel, including both the flavedo and the albedo are used together with the juicy inside of the orange. The slices are preferably about three-sixteenths of an inch ($\frac{3}{16}$ in.) thick, although thinner or thicker slices may be used. The slices are preferably but not necessarily cut perpendicularly to the line between the stem and the navel. The resulting slices are immersed and soaked in a solution in an open vessel of acetone in water of about one per cent (1%) strength preferably at room temperature and for about five (5) minutes. The solution of acetone may be stronger or weaker than one per cent (1%) and the time of soaking may be more or less than five (5) minutes, but one per cent (1%) and five (5) minutes have been found effective and may be considered as somewhat arbitrary, but nevertheless safe factors or conditions of operation. The soaking had best occur immediately after cutting to avoid delay and consequent loss of values in the orange by exposure to the air, and with this in view the slicing machine may deliver the cut slices directly into the acetone bath.

The soaking treatment may be varied and procedure may be according to the impregnating procedure set forth in my co-pending application, Serial No. 498,665 filed August 14, 1943, and entitled Dehydrated fruits and vegetables and methods of making them. Briefly stated, such impregnation occurs in a closed vessel. A solution of acetone in water of preferably about one per cent (1%) strength and the orange slices are placed therein with the slices covered by the solution, the vessel being almost full, with a small air space at the top. The vessel is sealed and connected at the top with a source of vacuum which causes reduction of the pressure therein and consequent expansion of air within the slices. The expanded air passes out of the orange slices into the liquid as bubbles, rises to the top of the container, and is removed by the suction creating the vacuum. Evacuation may continue to any desired degree or to the point where no more bubbles are formed. A five (5) minute evacuation with an aspirator and with the vessel almost filled with liquid is generally sufficient, and this affords the five-minute treatment with the one percent (1%) solution of acetone which is sufficient, as stated above. Upon increase of pressure within the container by decreasing the vacuum, or releasing it entirely or releasing it and applying greater than atmospheric pressure, whatever air is left within the orange slices, if any substantial amount is left therein, contracts and the solution penetrates into the slices.

After the above-described soaking, either with or without the use of vacuum, the soaked slices are dehydrated, best without washing and promptly to avoid delay and consequent exposure to the air. The dehydration is preferably effected in the usual dehydrating trays and by subjection to the conventional rapidly moving stream of hot air, the removal of moisture being down to any predetermined moisture content, preferably about three percent (3%) or lower. The air should be sufficiently hot to cause a sufficiently rapid dehydration, but if it is too hot it causes darkening of the product. A temperature of the dehydrating air of one hundred twenty-seven degrees Fahrenheit (127° F.) gives good results and is safely below the temperature at which darkening occurs. The solution of acetone including both solute and solvent is removed by evaporation during the dehydrating step, which makes washing to remove the acetone unnecessary.

An alternative method of procedure is by fumigation of the slices rather than by immersion thereof in the acetone bath. As an example thereof, the freshly cut slices may be subjected to dehydration while spread on the conventional trays, with an open pan of acetone in the dehydrator. In this case the vents to the outside of the dehydrator are preferably closed, and the air is recirculated through the dehydrator. The acetone volatilizes and is circulated and recirculated past the slices, and has very much the same effect thereon as the immersion treatment described above. The duration of the fumigation treatment as described above has been varied in a small size dehydrator up to fifteen (15) minutes, and five (5) minutes has generally been found sufficient. It may perhaps take longer to build up the effective concentration of the fumigant if a large dehydrator be used. The period of treatment required will depend on the dimensions of the dehydrator, the amount of exposed surface of fumigant, and perhaps other factors as well. The optimum period of time can be easily and definitely determined for any set of conditions of operation by varying the time until the same results are obtained as by the immersion treatment described above. After sufficient treatment by this fumigation method, the vents of the dehydrator may be opened and dehydration may then proceed in the manner described above.

Navel oranges have been pretreated by a different method, namely dipping uncut oranges into a solution of acetone in water of about one per cent (1%) strength for about fifteen (15) minutes, removing them and allowing them to stand for about forty-eight (48) hours, then slicing and dehydrating the slices as described above.

The dehydrated material is comminuted to a powder. Comminuting is preferably by cutting rather than by grinding, since cutting develops less heat, and the material may be cut to such a degree that it will pass through an eighty (80) mesh screen, or preferably even finer. Comminuting devices having knives which may or may not be of the hammer type operating within a container, the bottom of which consists of a screen which permits fine material to pass therethrough and the top of which consists of a trough or hopper to feed material into the comminuter, are conventional. Such a mill having a screen finer than eighty (80) mesh is preferred as a matter of expediency and it is also preferred to operate it in a continuous manner, feeding material into it in a continuous stream and obtaining a continuous stream of comminuted material through the screen. Operation may, however, be on the batch principle instead of continuous.

The humidity should be controlled during grinding since if it is too high the material will take up water because it is hygroscopic, and then it becomes sticky, which condition should be avoided. Furthermore the temperature should be controlled in the comminuting step which has a tendency to generate heat. Too high a temperature will cause the dehydrated material to soften, become sticky, darken, and have an undesired change in flavor. An easy way to control the humidity and the temperature is to place a sufficient amount of solid carbon dioxide into the comminuter along with the material to be comminuted and this is preferably accomplished by feeding it into the stream of material flowing into the comminuter. Comminuting thus occurs in an atmosphere of continuously supplied gaseous carbon dioxide formed from the solid carbon dioxide within the comminuter, and it drives out moisture and air present within the comminuting chamber and cools the contents thereof. Removal of the air is beneficial since oxidation effects thereof on the orange materials are prevented. This method of control of humidity and temperature is given merely as an example since it is understood that air-conditioning apparatus and cooling may be used to effect the proper controls of both. A relative humidity of twenty per cent (20%) or less will be effective.

Any of the treatments described above may also be applied to other oranges than navels, and to grapefruits, lemons, limes and other citrus fruits with more or less correspondingly good results. The vitamin potency of citrus fruits which is ordinarily lost on exposure to the air is preserved to a great extent because the time between steps is maintained at a minimum, and possibly also to inactivation of enzymes present. Dehydrated citrus peel treated according to this invention becomes more edible and palatable. Such improvement in taste or flavor may be characterized as akin to ripening. Peels of citrus fruits can thus be made tasty and pleasant when eaten in dehydrated condition.

It is very important that citrus peels can be made palatable, since it has been found that they generally contain a higher proportion than, and often several times as much, ascorbic or cevitamic acid or vitamin C and perhaps other nutritive values as the inside. This invention thus provides a new and palatable source of nutritive material from a source which was practically never previously ingested because it was not palatable and it does this in addition to providing dehydrated and other citrus fruits which could not be dehydrated successfully to produce palatable material, as well as providing dehydrated citrus products having a higher content of vitamin C than previously dehydrated citrus material. Vitamin losses can be held to a minimum by following the preferred procedure.

The product of dehydrating all of the navel oranges by the above procedure is useful in cooking, baking, in alcoholic and other drinks. For a beverage reconstituted from the dehydrated orange powder, water is to be added, and it is also desirable for the control of flavor to add edible acid and sugar. A good formula for a beverage is:

| | Grams |
|---|---|
| Dehydrated orange powder | About 10 |
| Sucrose | About 25 |
| Dextrose | About 15 |
| Edible acid | About 3 to 5 |
| Water | About 450 | all well stirred. Malic, citric, tartaric acid and the like may be used. Malic acid is preferred, three (3) grams being used in the formula for a somewhat sweet drink and five (5) grams for a somewhat sour drink. Malic acid is preferred because it tends to prevent or retard the development of bitterness. Tartaric acid is preferred with dehydrated grapefruit because it improves the flavor thereof. A fromula for a grapefruit beverage is:

| | Grams |
|---|---|
| Dehydrated grapefruit powder | About 5 |
| Sucrose | About 50 |
| Dextrose | About 15 |
| Tartaric acid | About 3 |
| Water | About 450 |

Such beverages may be kept for several days, after which bitterness may develop. It is practically stable, since there is seldom if ever any practical necessity for the beverage to remain stable for many days, although it is often required to remain stable for several hours which orange juice freshly squeezed from fresh oranges will not do. Large quantities of reconstituted beverage made according to this invention can accordingly be prepared for individual distribution to many people.

Dehydrated slices made as described above have been separated into peel and inside material. The peel was discarded and the inside material used in place of dehydrated whole orange material to make a reconstituted navel orange drink. Alternatively, the peel of raw navel oranges may be discarded and only the juice-containing inside may be treated as described above to produce a dehydrated product which may be reconstituted into a beverage. These two procedures produce products which are substantially the same. They have a pleasant flavor if drunk immediately, but they are apt to turn bitter very fast, within a half hour. Reconstituted navel orange beverage made from the dehydrated product of this invention containing peel remains stable against the development of bitterness for two (2) to three (3) days. Some navel oranges, perhaps due to the time of the year at which they ripened, or were pickel, or to some other condition, will quickly develop bitterness without the acetone or equivalent treatment, while others will not develop bitterness without such treatment. The peel material appears to be capable of retarding the development of bitterness in the drink.

Reconstituted drinks made from dehydrated navel orange peel without the dehydrated inside portion which ordinarily is eaten, and treated according to this invention are, surprisingly, better than similar drinks made of dehydrated inside without the peel and even better than similar drinks made from both peel and inside.

Thus there are several reasons why it is highly preferable to include the entire peel material, which is one of the features of this invention. Another feature thereof is the avoidance of the disagreeable burning sensation which normally would occur in the presence of the peel. An advantage of the invention is that it makes possible the certainty of successful dehydration of navel oranges, as well as the production of dehydrated navel orange material which can be reconstituted into a drink which does not turn bitter very quickly. The invention is also applicable to other oranges than navels, as well as to grapefruits, lemons, limes and other citrus fruits.

The product when completed, or at any desired stage in its preparation can be fortified with any desired vitamin. For example, a solution of carotene in oil made from carrots by extraction, when added to the reconstituted drink not only added a source of vitamin A, but also imparted a pleasing color thereto and a fruity flavor. Other materials may be added as desired.

Other materials may be used in place of acetone. An example thereof is acetaldehyde. Other aldehydes and ketones may be used; but those which are toxic or impart an undesirable or too strong a flavor should be avoided unless they are completely evaporated in the dehydrating step or otherwise removed or neutralized. The carbonyl group

thereof seems to promote the desired effects, that is, not only inactivation of enzymes present, but makes the peel agreeable to ingest while permitting large amounts of vitamins to remain present. Formaldehyde, anisaldehyde, cinnamic aldehyde, diacetone, furfural and urea may be used. However, acetone and acetaldehyde are preferred and of these two acetone is the first choice.

It is desirable but not essential to remove whatever seeds may be present since they may lend an unwanted flavor to the products. Differently tasting products may be made by using only the flavedo part or the albedo part of the peel or by proportioned combinations of both. This product may or may not include the inside juicy portion of the fruit.

Various details which have been referred to for the purpose of describing the invention may be varied without departing from the spirit thereof.

I claim:

1. The process of making dehydrated citrus material, which comprises cutting citrus fruit into pieces, treating the resulting pieces with a compound containing a carbonyl radical and dehydrating the resulting material.

2. The process of making dehydrated citrus material, which comprises slicing citrus fruit, treating the resulting sliced material with a compound containing a carbonyl radical and dehydrating the sliced material, and holding exposure to the atmosphere of the sliced material to a minimum.

3. The process of making dehydrated citrus material, which comprises cutting whole citrus fruit into pieces, treating the resulting pieces with a member of the group which is volatile under the conditions of subsequent dehydration and consists of a ketone and an aldehyde, and dehydrating the resulting material.

4. The process of making dehydrated citrus material, which comprises cutting citrus fruit into pieces, treating the resulting pieces with a member of the group consisting of acetone and acetaldehyde, and dehydrating the resulting material.

5. The process of making dehydrated citrus material, which comprises cutting whole citrus fruit into pieces, treating the resulting pieces with a member of the group consisting of acetone and acetaldehyde, while holding exposure to the atmosphere of the cut material to a minimum, dehydrating the resulting material, and comminuting the dehydrated material while maintaining the humidity and temperature low enough to prevent the material from becoming sticky or dark.

HAROLD K. DERBY.